United States Patent
Schäfer

(10) Patent No.: US 7,455,169 B2
(45) Date of Patent: Nov. 25, 2008

(54) DISCHARGE POINT IN A COMMISSIONING SYSTEM

(75) Inventor: Gerhard Schäfer, Neunkirchen (DE)

(73) Assignee: SSI Schäfer PEEM GmbH, Graz (AT)

( * ) Notice: Subject to any disclaimer, the term of this patent is extended or adjusted under 35 U.S.C. 154(b) by 438 days.

(21) Appl. No.: 10/551,066

(22) PCT Filed: Mar. 31, 2004

(86) PCT No.: PCT/AT2004/000113
§ 371 (c)(1), (2), (4) Date: Jan. 12, 2006

(87) PCT Pub. No.: WO2004/087503
PCT Pub. Date: Oct. 14, 2004

(65) Prior Publication Data
US 2006/0207860 A1      Sep. 21, 2006

(30) Foreign Application Priority Data
Mar. 31, 2003 (AT) ............................... A 498/2003

(51) Int. Cl.
*B65G 47/46* (2006.01)
(52) U.S. Cl. ................. 198/369.2; 198/600; 198/369.3
(58) Field of Classification Search ............ 198/369.1, 198/369.2, 539, 600, 540, 550.2, 860.1, 369.3, 198/369.7
See application file for complete search history.

(56) References Cited

U.S. PATENT DOCUMENTS

| | | | | |
|---|---|---|---|---|
| 3,342,106 A | * | 9/1967 | Batorski et al. ............... | 409/14 |
| 4,372,730 A | | 2/1983 | Ladt | |
| 4,534,156 A | * | 8/1985 | Smith ......................... | 53/503 |
| 4,948,321 A | * | 8/1990 | Wilding et al. ............ | 198/550.2 |
| 5,649,800 A | * | 7/1997 | Hemmersbach et al. ...... | 198/600 |
| 6,390,278 B1 | * | 5/2002 | Brown ....................... | 198/369.2 |
| 6,776,277 B2 | * | 8/2004 | Wiehler ..................... | 198/369.2 |
| 2002/0170850 A1 | | 11/2002 | Bonham et al. | |

FOREIGN PATENT DOCUMENTS

| | | |
|---|---|---|
| DE | 35 33 382 | 6/1986 |
| DE | 35 33 382 A1 | 6/1986 |

(Continued)

OTHER PUBLICATIONS

International Search Report.

*Primary Examiner*—James R Bidwell
(74) *Attorney, Agent, or Firm*—Collard & Roe, P.C.

(57) ABSTRACT

A conveying system with at least one conveying element (2), preferably a conveyor belt, with goods (3) conveyed on the same being delivered at the end of the conveying element (2) to a container (1) situated beneath the conveying element (2). In order to provide a conveying system which allows a transfer of the goods by the conveying element to the provided container without subjecting the goods to a likelihood of damage it is provided that the movable flap (6) in the position sealing the container opening can be pivoted to a position parallel to the inclined sliding surface (4) and is movably held in this position parallel to the sliding surface (4) in order to form a second sliding surface projecting into the container (1) and extending the inclined sliding surface (4).

7 Claims, 2 Drawing Sheets

FOREIGN PATENT DOCUMENTS

| | | |
|---|---|---|
| EP | 0 183 074 | 6/1986 |
| EP | 0 183 074 A1 | 6/1986 |
| EP | 0 571 874 | 12/1993 |
| EP | 0 571 874 A | 12/1993 |
| FR | 1 491 666 | 8/1967 |
| FR | 1 491 666 A | 8/1967 |
| JP | 06316326 A | 11/1994 |

* cited by examiner

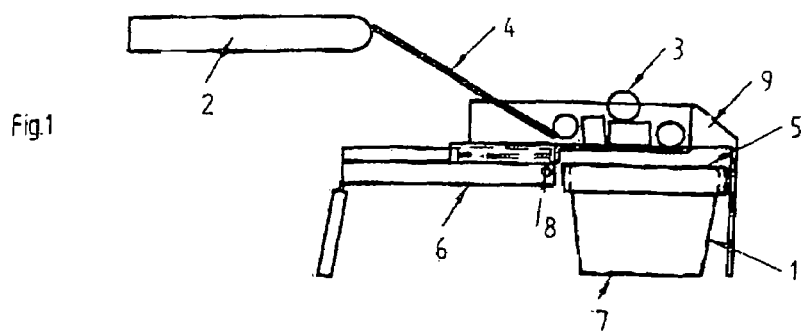
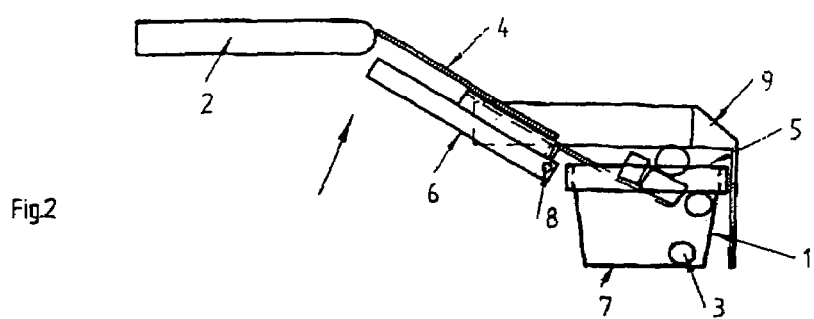
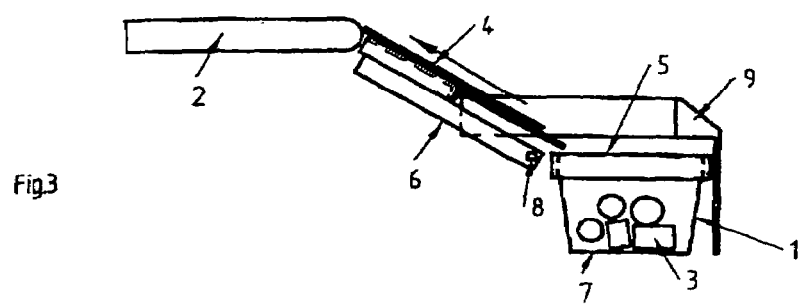
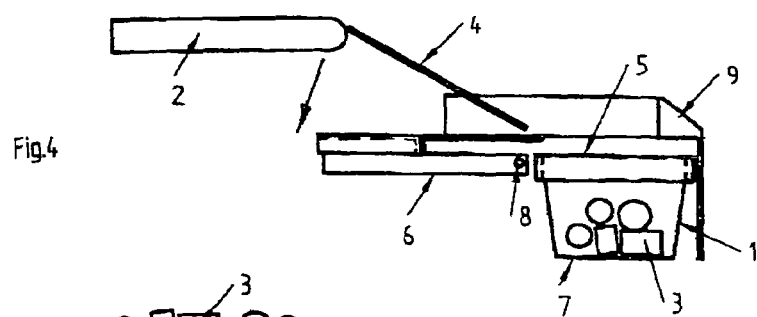
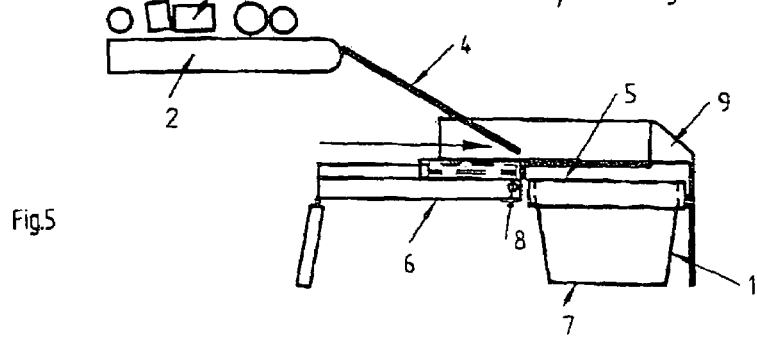

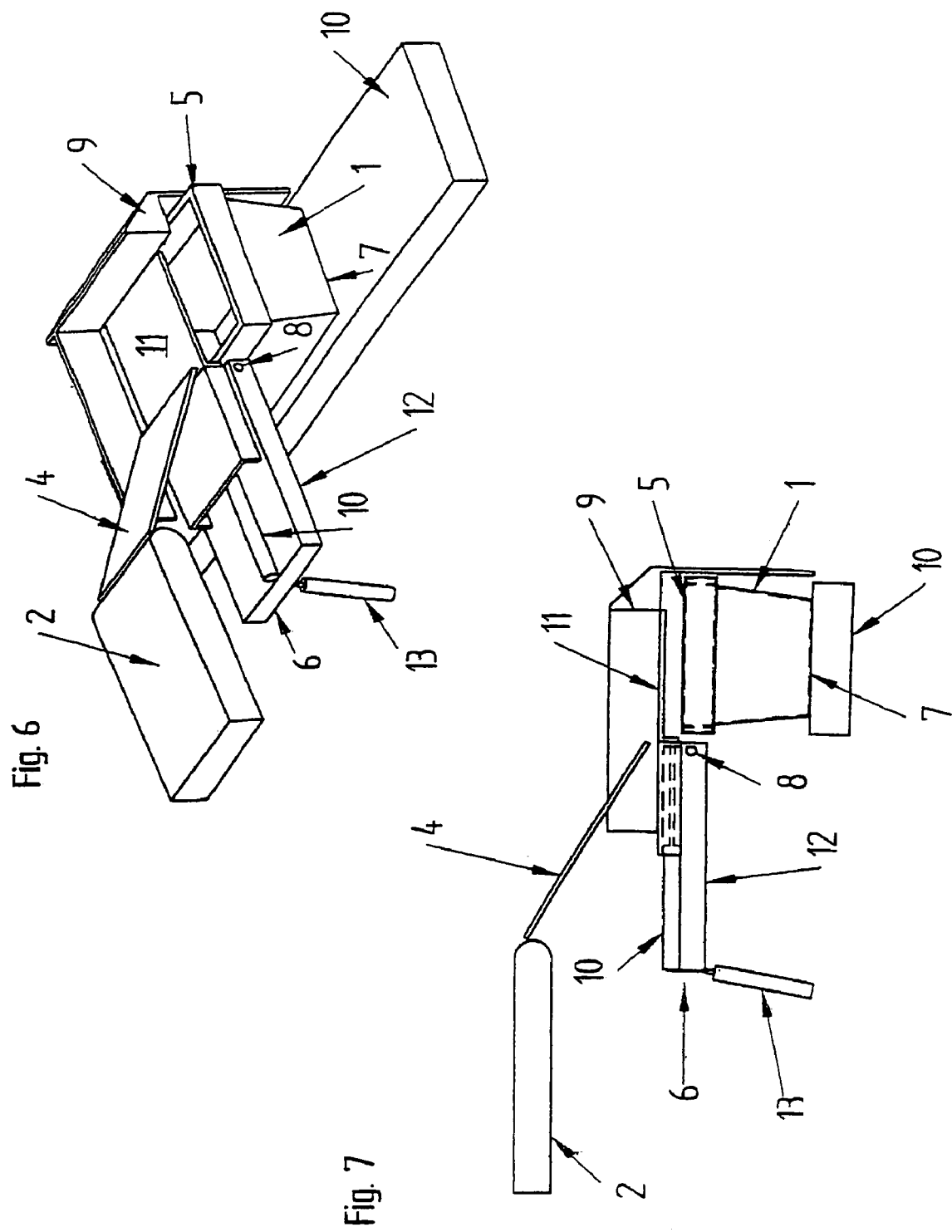

DISCHARGE POINT IN A COMMISSIONING SYSTEM

CROSS REFERENCE TO RELATED APPLICATIONS

Applicants claim priority under 35 U.S.C. §119 of Austrian Patent No. A498/2003, filed on Mar. 31, 2003. Applicants also claim priority under 35 U.S.C. §365 of PCT/AT2004/000113 filed Mar. 31, 2004. The international application under PCT article 21(2) was not published in English.

The present invention relates to a conveying system with at least one conveying element, preferably a conveyor belt, with goods conveyed on the same being delivered at the end of the conveying element via an inclined sliding surface to a container situated beneath the conveying element, which container is preferably enclosed by a filling aid and a horizontally movable flap is provided which can be moved from a position closing the container opening to a position releasing the container opening, in accordance with the preamble of claim 1.

Transfer stations without a flap opening the container opening are known for example from US 2002/0170850 or EP 183.074 A1.

Although embodiments of such transfer stations are known in which filling aids in the form of preferably funnel like walls enclosing the container on three sides in order to prevent the inadvertent ejection and damaging of the goods from the container, the heights of fall which are relatively high depending on the product strongly limit the use of such transfer stations, because sensitive and heavy products can be damaged by the free fall.

In order to reduce the height of fall on the one hand and to enable a change of containers on the other hand without having to stop the conveying element, it is also known in known transfer stations to also provide an additional horizontally movable flap which closes the opening of the provided container. The same is moved during the change of container between the inclined sliding surface and the container, so that the conveying element need not be stopped and the goods can be conveyed further. They are then conveyed via the inclined chute onto the flap sealing the container opening. A change of containers occurs beneath said flap in the meantime. Once the same is completed, the movable flap is withdrawn parallel to the container floor, as a result of which the container opening is released again and the goods can fall into the container.

Even in this case, at least the height of the container remains which the goods need to cover in free fall, which thus leads to the likelihood of damage to the goods however.

A relatively complex method is known from JP 06316326 A to convey the goods from the conveying path to the container, with a type of elevator being used which conveys the goods from the level of the conveying path downwards to the container floor. In addition to the mentioned required high constructional complexity, the run time in such a system is strongly limited because the displacement of the flap needs a lot of time.

It is therefore the object of the present invention to prevent the described disadvantage and to propose a conveying system which allows a transfer of the goods from the conveying element to the available containers without subjecting the goods to any likelihood of damage.

This is achieved by the characterizing features of claim 1.

This prevents that during the withdrawal of the movable flap the goods will freely fall into the available container. The free fall is braked by using the movable flap as a further sliding surface projecting into the container. The flap is swiveled for this purpose from the position sealing the container opening to a position parallel to the existing inclined sliding surface. As a result, the one end of the flap on which the goods come to lie lowers into the container. Once the swiveling movement has been completed, the flap is withdrawn parallel to the inclined sliding surface, as a result of which more volume of the container is released and the goods are allowed to slide into the container. It is thus prevented that the goods will be subjected to free fall into the container.

According to the characterizing feature of claim 2, the movable flap can be moved close to the container floor in order to prevent the complete dropping of the goods. The movable flap is withdrawn to the same extent to which the container is filled. The volume in the container is thus continuously increased in line with the degree of filling.

The characterizing feature of claim 3 allows moving the movable flap to the position parallel to the inclined sliding surface. This occurs preferably by means of a lifting apparatus arranged at one end of the flap, preferably a pneumatic cylinder.

According to the characterizing feature of claim 4, the swivelable flap is composed of two mutually displaceable, superimposed plate elements. This advantageous configuration allows using the one plate element as a guide rail on which the other plate element can perform its translatory movement. The movement per se is enabled by a displacing apparatus arranged between the two plate elements, which displacing element is a pneumatic cylinder according to the characterizing feature of claim 5.

A special embodiment of a conveying system in accordance with the invention provides that the displacing apparatus can be arranged in a hollow chamber formed in one of the two plate elements as a result of the special configuration of the cross section of the one plate element according to the characterizing feature of claim 6.

The characterizing feature of claim 7 describes a further preferred embodiment of the invention.

The invention is now explained in closer detail by reference to the enclosed drawings, wherein:

FIG. 1 shows a side view of a transfer station in accordance with the invention with a closed flap;

FIG. 2 shows a side view of a transfer station in accordance with the invention with a flap projecting into the container;

FIG. 3 shows a side view of a transfer station in accordance with the invention with a retracted flap in the inclined position;

FIG. 4 shows a side view of a transfer station in accordance with the invention in a horizontal position;

FIG. 5 shows a side view of a transfer station in accordance with the invention with a closed flap;

FIG. 6 shows an oblique view of a transfer station in accordance with the invention with a closed flap;

FIG. 7 shows a side view of a transfer station in accordance with the invention with a closed flap.

FIG. 1 shows a schematic side view of a transfer station in accordance with the invention. A container 1 which is preferably conveyed on a conveyor belt 10 is provided beneath a conveying element 2, preferably a conveyor belt. Goods 3 are transported on the conveyor belt 2 which are to be conveyed into the provided container 1. For this purpose there is provided an inclined sliding surface 4 which is arranged between the conveyor belt 2 and the container 1. The sliding surface 4 reaches closely up to the upper edge 5 of the container 1 and faces into the same. A flap 6 is arranged beneath the sliding surface 4 which is held in a substantially horizontally movable manner in order to seal or release the container opening. FIG. 1 shows said flap 6 in the position sealing the container opening. Goods 3 are stacked on the flap 6 which are conveyed up by the continuously operated conveying element 2. By using the flap 6 which seals the container opening, the conveying element 2 can be continued to be operated without standstill despite the change of container 1. The goods 3 sliding into the container 1 via the sliding surface 4 are intermediately stored on the flap 6.

Once the change of container has been completed, there will first be the pivoting of the flap 6 about an axis 8 (as shown in FIG. 2), by which it is brought to a position parallel to the sliding surface 4. It is also possible that the flap 6 is brought to a position in which it encloses an angle with the sliding surface 4. As a result of the pivoting of the flap, its one end region moves into the container 1 and thus forms an extension of the sliding surface 4, as a result of which the goods 3 situated on the flap 6 slide into the container 1. In this position in which the flap 6 is still fully extended, a majority of the container volume is blocked by the portion of the flap 6 still projecting into the container. The flap 6 is continuously withdrawn for this reason with rising degree of filling of the container 1. The movement is preferably made at high speed in order to avoid slowing down the entire transfer process unnecessarily.

FIG. 3 shows the flap 6 in the completely withdrawn position in which it is arranged parallel to the sliding surface 4, but does not project into the container 1. The goods 3 have already been completely transferred to the container 1 at this point, which is now ready for changing again.

For this purpose, the flap 6 is swiveled about the axis 8 again, as a result of which it arrives at a substantially horizontal position as shown in FIG. 4, from which it is pushed over the container opening again in order to enable the change of container, as shown in FIG. 5.

FIG. 6 shows a detailed inclined view of a transfer station in accordance with the invention with a closed flap 6. The filling aid 9 can also be recognized very well, which aid is made up of wall elements enclosing the container opening and extending upwardly, and is used for preventing the inadvertent loss of goods from the container 1. The front wall element closer to the viewer was not drawn for reasons of clarity of the illustration.

The movable flap 6 is composed of two mutually displaceable, superimposed plate elements 11, 12 which receive between themselves a displacing apparatus 10 which performs the relative movement of the two plate elements 11, 12 with respect to each other. The displacing apparatus 10 is formed in the present example as a pneumatic cylinder which allows the sliding of the upper plate element 11 on the lower plate element 12 and thus the entrance into and retraction from the container 1. The upper plate element 11 is provided in its cross section at least partly in a U-shaped manner, so that it delimits a hollow space jointly with the lower plate element 12 in which the pneumatic cylinder 10 is arranged.

A further pneumatic cylinder 13 is arranged in the end region of the flap 6, or more precisely, of the plate element 12. Said pneumatic cylinder 13 controls the pivoting about the axis 8.

The invention claimed is:

1. A conveying system with at least one conveying element (2), with goods (3) conveyed on the same being delivered at the end of the conveying element (2) via an inclined sliding surface (4) to a container (1) situated beneath the conveying element (2), and a horizontally movable flap (6) is provided which can be moved from a position closing the container opening to a position releasing the container opening, wherein the movable flap (6) in the position sealing the container opening can be pivoted to a position parallel to the inclined sliding surface (4) and is movably held in this position parallel to the sliding surface (4) in order to form a second sliding surface projecting into the container (1) and extending the inclined sliding surface (4).

2. A conveying system according to claim 1, wherein the movable flap (6) reaches up to a container floor (7) in its pivoted and extended state.

3. A conveying system according to claim 1, wherein the movable flap (6) has a swiveling axis situated directly adjacent to an upper edge (5) of the container (1) and a lifting apparatus (13), comprising a pneumatic cylinder, acts upon the same at the end region of the flap (6) averted from the container (1), which pneumatic cylinder causes the pivoting movement.

4. A conveying system according to claim 1, wherein the movable flap (6) is composed of two mutually displaceable, superimposed plate elements (11, 12) between which a displacing apparatus (10) is arranged which causes the relative movement between the two plate elements (11, 12).

5. A conveying system according to claim 4, wherein the displacing apparatus (10) is a pneumatic cylinder.

6. A conveying system according to claim 4, wherein the upper plate element (11) comprises at least partly a substantially U-shaped cross section whose base and legs define a hollow space with the surface of the other, lower plate element (12) in which the displacing apparatus (10) is arranged.

7. A conveying system according to claim 4, wherein merely the upper plate element (11) comprising the U-shaped cross section is movable into the container.

* * * * *